May 20, 1941.  V. S. MAKAROFF  2,242,433
AUTOMOBILE LIFT
Filed Aug. 29, 1939

VADIM S. MAKAROFF
INVENTOR.

BY John P. Nikonov
ATTORNEY.

Patented May 20, 1941

2,242,433

UNITED STATES PATENT OFFICE 2,242,433

AUTOMOBILE LIFT

Vadim S. Makaroff, New York, N. Y.

Application August 29, 1939, Serial No. 292,397

8 Claims. (Cl. 254—91)

My invention relates to automobile lifts and has particular reference to automobile lifts operated by compressed air or a fluid under pressure.

My invention has for its object to provide an auto lift which can be used for raising an automobile or other vehicle in a horizontal position for performing work on the under parts of its chassis, while maintaining a free passage under the vehicle from one end to the other. I accomplish this object by providing supporting rails pivotally mounted on two pairs of arms, front and rear, each pair being rigidly connected together at the lower ends or at the ground, the connecting member being preferably in the form of a shaft journaled in suitable bearings on the base of the machine. Such a rigid construction of the lifting arms has an added advantage in that the lifting force on both arms in a pair is equalized so that it is not necessary to apply the lifting force to every arm in the system.

Such an arrangement of rigid U-shaped pairs of arms makes it possible to mount lifting air cylinders directly under the arms, thereby leaving the space between the arms clear and unobstructed. I prefer to use two cylinders for the lift, placing either both cylinders under the two rear arms, or placing one cylinder under one rear arm and the other cylinder under the front arm at the opposite side. The latter arrangement has an advantage of an equal lifting force being applied to both ends of the lift, the rigid pairs of the arms equalizing the force on all four arms.

Still another object of my invention is to provide means to prevent side sway of the arms when under load. This is accomplished by forming each arm of two beams spaced apart at the base in direction transverse to the rails along the connecting shaft, thereby rendering the structure rigid and of a relatively light weight, the air cylinders being placed between the two beams of each arm. The cylinder construction for my automobile lift is more fully shown and claimed in my copending patent application Serial No. 367,970, filed November 30, 1940.

My invention is more fully described in the accompanying specification and drawing in which—

Figure 1:
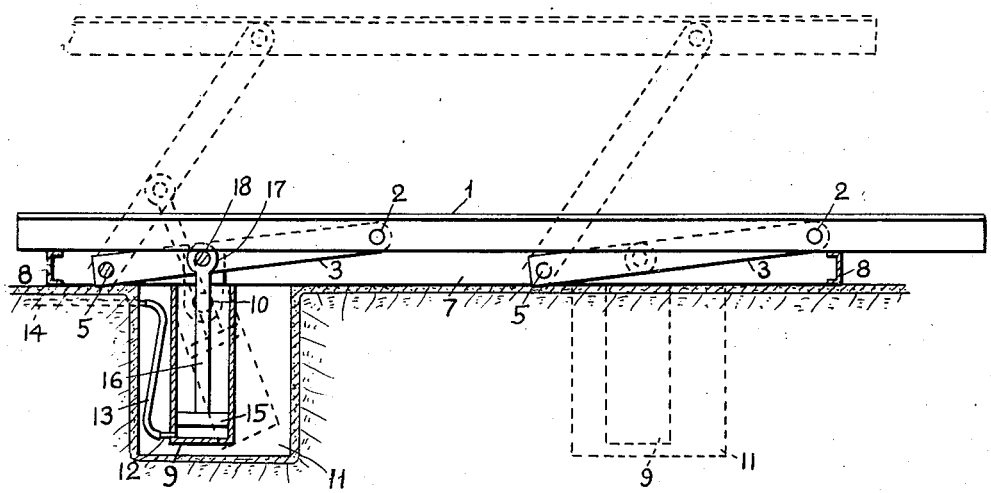
Fig. 1 is a sectional elevational view of my automobile life.
Figure 2:
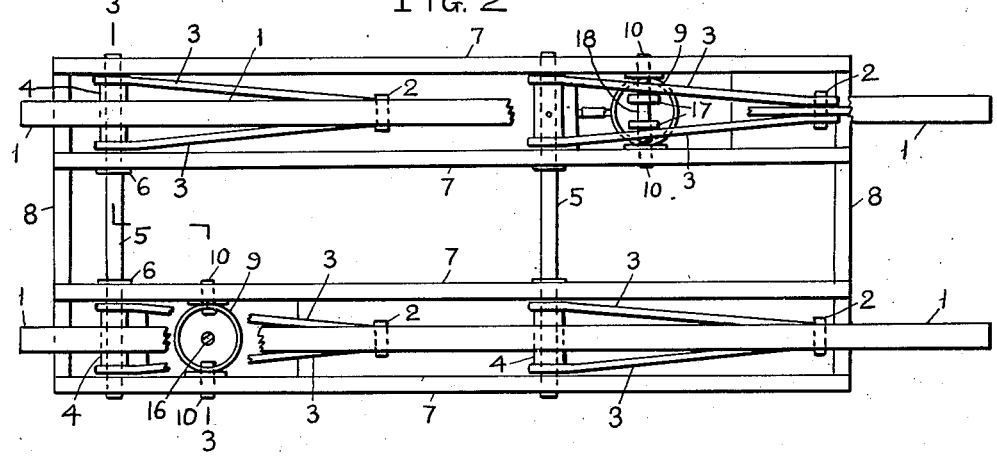
Fig. 2 is a top plan view of the same.
Figure 3:
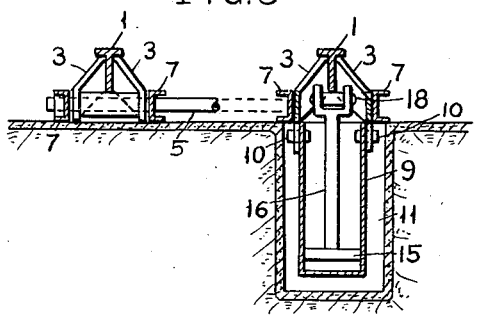
Fig. 3 is a sectional view taken on the line 3—3 of Fig. 2.

My automobile lift consists of a pair of rails 1 adapted to support an automobile or other vehicle, the rails being so spaced as to fit under the axles between the wheels of the vehicle. The rails are pivotally supported at 2 on lifting arms, each arm consisting of two beams 3 brought together at the top where they are attached to the rail, and spread apart at the lower ends where they are rigidly joined together by sleeves 4 and rigidly mounted on a shaft 5. Each shaft has two arms which thereby form a rigid U-shaped support for the rails. Additional cross braces may be provided between the two beams in each arm if desired. The shafts are journaled in bearings 6 fitted in two pairs of beams 7 joined together at the ends by cross beams 8 and forming a base for the lift.

One rear and one front arm are provided with air cylinders 9 pivotally supported on the base means 7 by short shafts or pins 10 passing through the wall of the cylinders at the top. The cylinders extend into pits 11 and have nipples 12 for flexible hose 13 connected to pipes 14 through which compressed air or other fluid under pressure is supplied to the cylinders. Pistons 15 are fitted in the cylinders and have piston rods 16 pivoted at 17 to cross bars 18 supported between the bams 3. It is understood, of course, that the end of the piston may be fitted rigidly in the cross bar 18, the latter being then rotatively supported in the beams 3.

The triangular shape of the arms makes them rigid against side sway or resilient deflections when they are raised with a load. They are spaced apart at the base for a distance corresponding to the diameter of the cylinder, thereby simplifying the construction.

The base may be considerably shortened by placing both cylinders under the rear arms, in which case the front shaft 5 may be journaled in an individual bearing supported directly on the ground or floor on which the lift is placed, and a short base will be needed only to support the cylinders with the rear shaft 5.

The rails 1 may be made of a type suitable to support the wheel of a vehicle in which case the rails will be spaced to correspond to the width between the wheels.

I claim as my invention:

1. A lifting device comprising two pairs of arms, members rigidly connecting the lower ends of each pair of the arms, a base having means to rotatively support the members, two rails, each rail being pivotally supported on one front and one rear arm, the arms being aligned in a parallel relation to each other, the rails being adapted to support an object, means applied individually to one of the arms on each side for raising the arms with the rails, each connecting member with its two arms forming a rigid inverted U-shaped structure, the connecting members forming a sole connection between the opposite arms, a free passage being thereby provided between the rails when they are raised.

2. A lifting device comprising two pairs of arms, members rigidly connecting the lower ends of each pair of the arms, a base having means to rotatively support the members, two rails, each rail being pivotally supported on one front and one rear arm, the arms being aligned in a parallel relation to each other, the rails being adapted to support an object, two motors, each motor being mounted directly under one of the arms on each side operatively connected thereto and partly extending under the base, the motors being adapted when energized to raise the arms with the rails, each connecting member with its two arms forming a rigid inverted U-shaped structure, the members forming a sole connection between the opposite arms.

3. An automobile lift comprising two pairs of arms, members rigidly connecting the lower ends of each pair of the arms, a base having means to rotatively support the members, two rails, each rail being pivotally supported on one front and one rear arm, the arms being aligned in a parallel relation to each other, the rails being adapted to support an automobile, motors mounted directly under some of the arms operatively connected thereto and partly extending under the base, one motor being mounted under one rear arm, the other motor being mounted under the front arm opposite the first motor, each connecting member with its two arms forming a rigid inverted U-shaped structure, the members forming a sole connection between the opposite arms, a free passage being thereby provided between the rails when they are raised.

4. An automobile lift comprising a base formed of longitudinal beams joined by cross-bars, a pair of front arms and a pair of rear arms, front and rear shafts rigidly connecting the respective rear and front arms, bearings for the shafts in the base beams, parallel rails pivotally supported on the upper ends of the arms, the arms with the rails and with the base beams forming two parallelograms in parallel relation to each other, means to raise the arms with the rails including a rod pivotally connected to an arm on each side and extending under the base, and a motor under the base pivotally supported on a base beam, each motor being operatively connected with the respective rod, the motors when energized being adapted to raise the rod, thereby raising the arms with the rails, the shafts forming a sole connection between the opposite arms, a free passage being thereby provided over the base between the rails in their raised position.

5. An automobile lift comprising two pairs of arms, members rigidly connecting the lower ends of each pair of the arms, a base having means to rotatively support the members, two rails, each rail being pivotally supported on one front and one rear arm, the arms being aligned in a parallel relation to each other, the rails being adapted to support an automobile, each arm comprising two beams converging at the top to the rail and spaced apart at the junction with the member, the arms being thereby rendered rigid in direction transverse to the rails, and means to raise the arms with the rails including a motor mounted on the base directly under an arm, each motor being operatively connected to the respective arm for raising the arms with the rails.

6. An automobile lift comprising two pairs of arms, members rigidly connecting the lower ends of each pair of the arms, a base having means to rotatively support the members, two rails, each rail being pivotally supported on one front and one rear arm, the arms being aligned in a parallel relation to each other, the rails being adapted to support an automobile, each arm comprising two beams converging at the top to the rail and spaced apart at the junction with the member, the arms being thereby rendered rigid in direction transverse to the rails, means to raise the arms with the rails including a cross-bar each supported on the middle portions of one of the beams of an arm, a rod pivotally connected to the cross-bar extending downward, a piston on the rod, a cylinder rotatively supported on the base for the piston, and means to energize the cylinder, thereby raising the arms with the rails, the members forming a sole connection between the opposite arms.

7. A lifting device comprising spaced front arms and spaced rear arms, a first rail connecting one set of front and rear arms, a second rail connecting another set of front and rear arms, a base supporting said arms, a motor device operating between one of said arms and said base, said motor device comprising a cylinder secured to and disposed under said base, and a piston in said cylinder connected to said one arm, said cylinder lying directly under said one arm and the rail to which it is connected.

8. A lifting device comprising spaced front arms and spaced rear arms arranged in pairs, a first rail connecting one set of front and rear arms, a second rail connecting another set of front and rear arms, a base supporting said arms, at least one of said arms comprising spaced beams converging to their junction with the rail to which they are connected and spaced apart at their junction with said base, a motor device associated with said spaced beams and lying directly thereunder, said motor device comprising a cylinder pivoted at its upper end to said base and having its closed end below said base, and a piston in said cylinder pivoted to said spaced beams, and means rigidly connecting a pair of said arms.

VADIM S. MAKAROFF.